Aug. 14, 1934.  C. M. TOWNSEND  1,970,439
ANTIFRICTIONAL BEARING
Filed Jan. 13, 1932  4 Sheets-Sheet 4
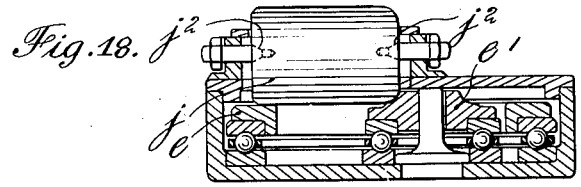
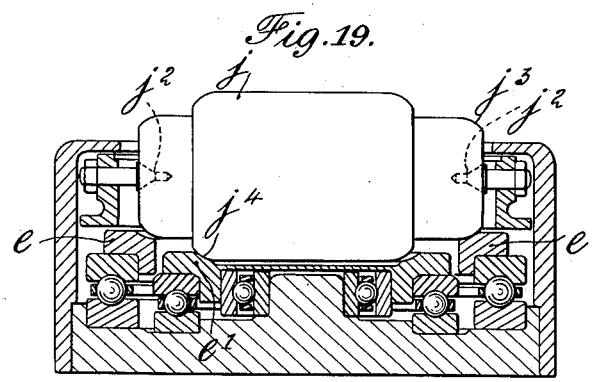
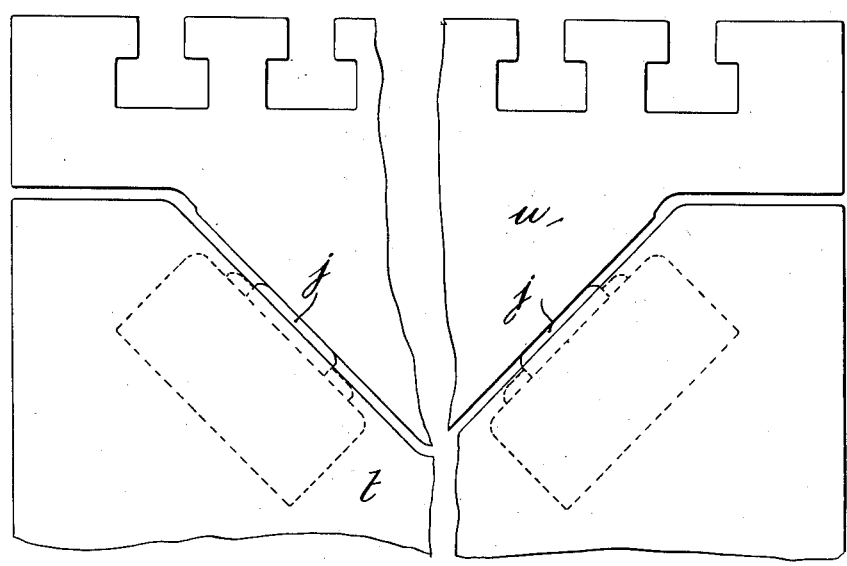
INVENTOR
CLAUDE M. TOWNSEND
BY
ATTORNEYS Patented Aug. 14, 1934

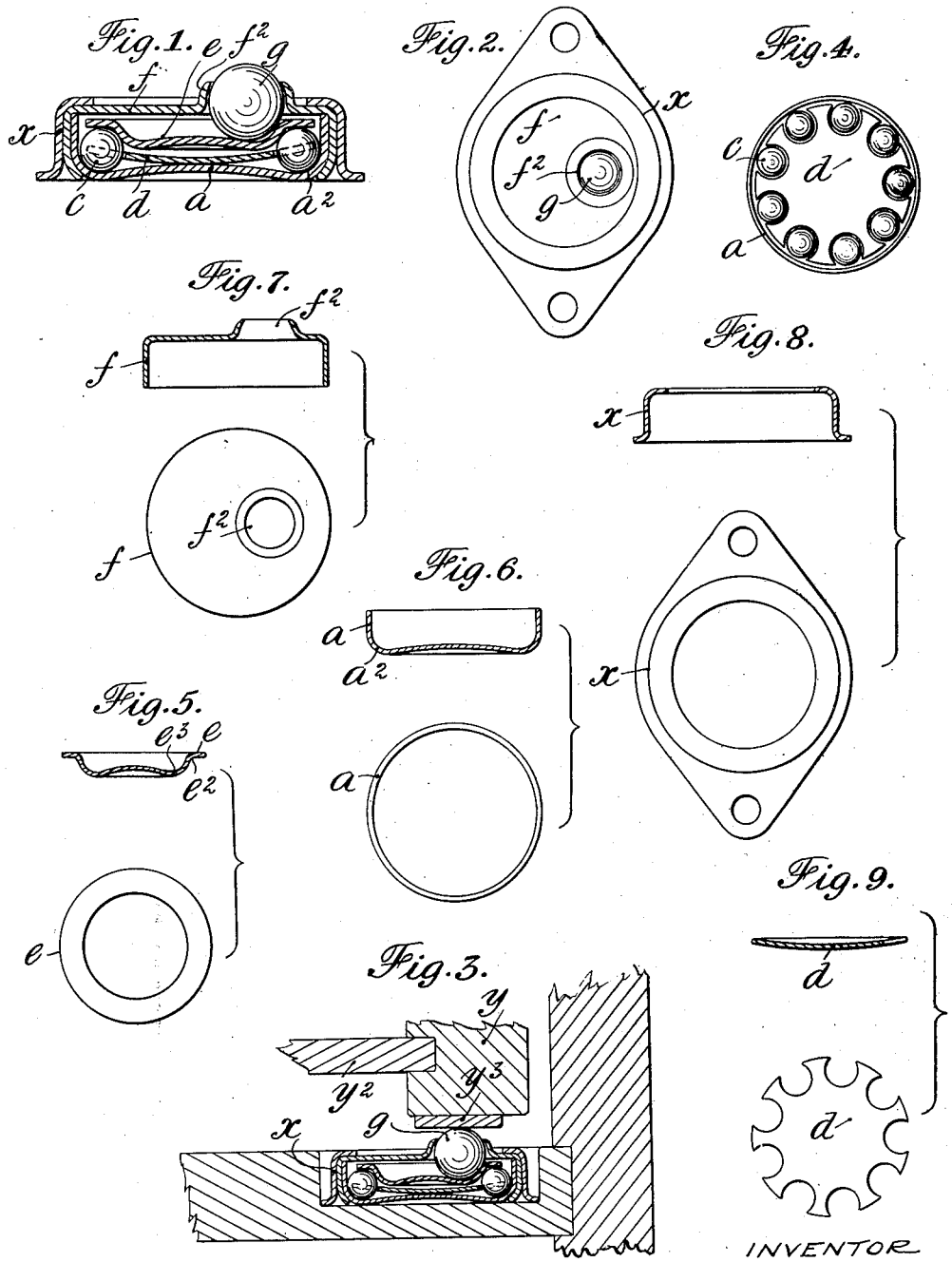
Aug. 14, 1934.  C. M. TOWNSEND  1,970,439
ANTIFRICTIONAL BEARING
Filed Jan. 13, 1932  4 Sheets-Sheet 1
INVENTOR
CLAUDE M. TOWNSEND
BY
Richards & Geier
ATTORNEYS

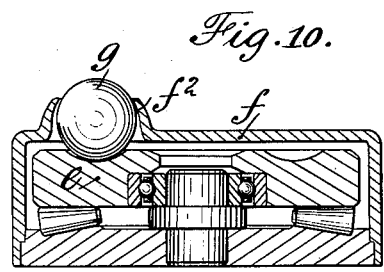
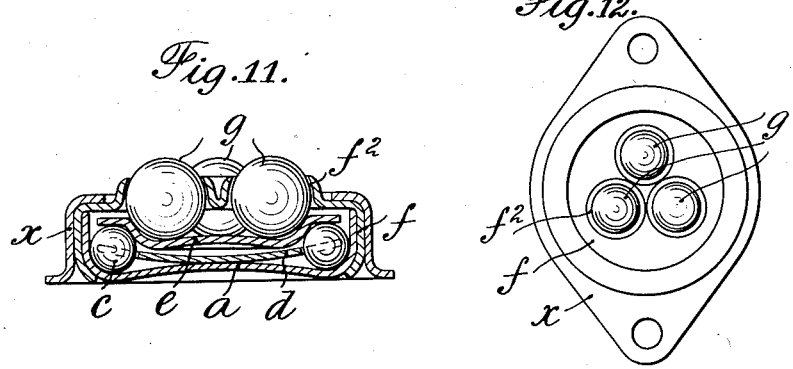
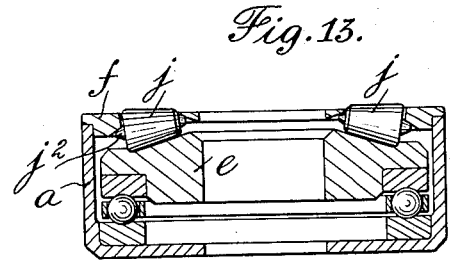

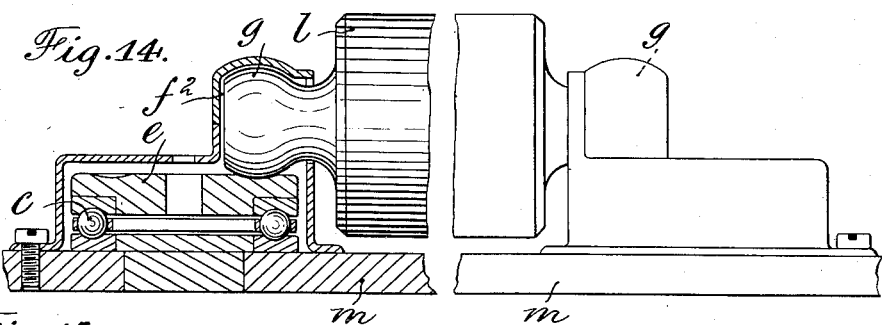
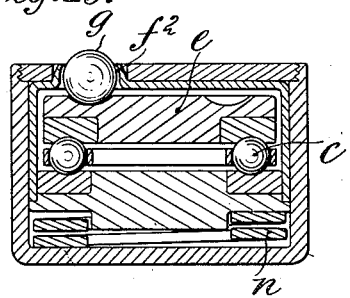
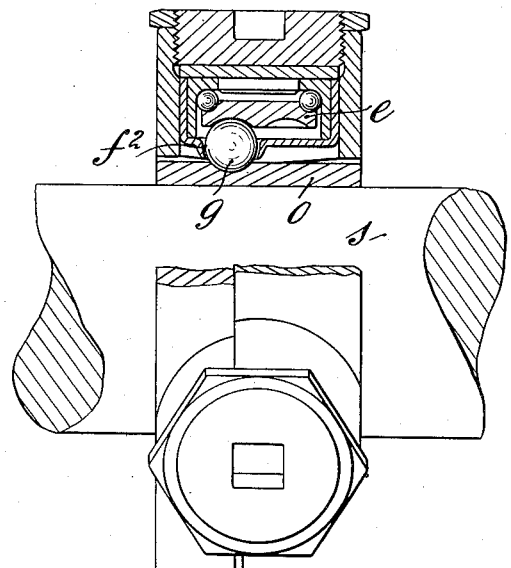
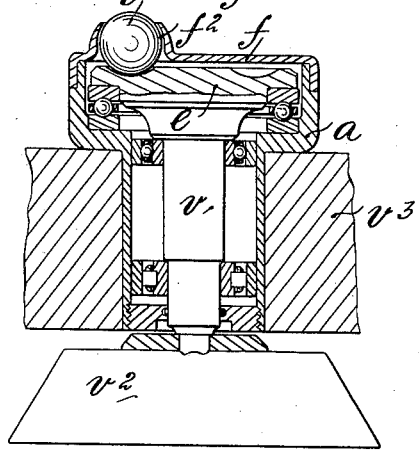

1,970,439

UNITED STATES PATENT OFFICE 1,970,439

ANTIFRICTIONAL BEARING

Claude Mortimer Townsend, Birmingham, England

Application January 13, 1932, Serial No. 586,437
In Great Britain January 13, 1931

1 Claim. (Cl. 308—227)

The invention provides the hereinafter described and claimed combination of parts forming an efficient anti-frictional bearing suitable for many purposes in which straight-line or substantially straight-line movements of loads take place in relation to stationary supports as, for example, straight-line moving conveyors, drawers, doors, and the like, and also rotary movements in relation to stationary supports as, for example, rotating shafts and spindles.

The combination anti-frictional bearing according to the invention embodies a table adapted for revolution upon a carrier, a load member, such as a ball, adapted to work in contact with one of the faces of the table, means for antifrictionally supporting the table upon the carrier both as to axial and transverse thrust, and means for (1) maintaining the load member in a stationary position eccentric to the axis of rotation of the table and inwardly of the axial thrust support for said table, and (2) ensuring that the load member is revoluble about its own axis only at such maintained position and is otherwise immovable. The invention also provides for the revoluble table having each of its faces formed as a ball race, and for the carrier being in the form of a casing adaptable for containing lubricant, and also for said carrier being in the form of a circular cup with a closure cap, the latter having a hole in it for location of the load member. Also the invention provides for two tables on the same carrier, and for the load member to work in contact with the face of each table, and also for the table to drive a concentric shaft, all the combinations of parts providing a cheaply constructed and effective anti-frictional ball or roller bearing demanding no adjusting or no settings, and in one form usable as a lubricant-containing unit capable of being applied to a suitable mounting.

The invention in some of its forms is represented by the accompanying sheets of drawings.

Fig. 1 is a vertical section.

Fig. 2 is a plan of Fig. 1.

Fig. 3 shows the bearing in use for a drawer.

Fig. 4 is a plan of the ring of nested and seated balls Fig. 1.

Figs. 5–9 are separate views of parts of Fig. 1.

Fig. 10 is a section of a form similar to Fig. 1.

Fig. 11 is a section, and

Fig. 12 is a plan, of a modification.

Fig. 13 is a section of a further modification.

Fig. 14 is a sectional elevation of an adaptation of the invention.

Fig. 15 is a section of a variant.

Fig. 16 is a sectional elevation of a manner of using the invention.

Fig. 17 is a section of another modification.

Fig. 18 is a section of a further modification.

Fig. 19 is a section of a still further modification.

Fig. 20 is a diagram showing an application of the bearing Fig. 19.

With reference to Figs. 1–9, a steel pressing $a$ provides a shallow circular cup (Fig. 6) having right-angled sides and a bottom which is raised slightly at the middle to form a boundary race $a2$ for the reception of a ring of balls $c$ which are spaced apart, or caged, by a plate $d$ (Fig. 9).

Loosely placed within the cup on top of the ring of balls is a rigidly built circular table $e$ (Fig. 5) formed on its underside with a circular ball race, $e2$, and upon its upper side with a circular ball race $e3$, this table to freely revolve within the cup about the axis of the ring of balls.

A pressed steel cap $f$ with a hole $f2$ in it telescopes over the cup $a$ to close the top of the cup except for the hole $f2$, the walls of this cap being closed over the bottom of the cup at $f3$ to immovably secure the cap to the cup.

The hole $f2$ in the cap is eccentric to the axis of the cap and therefore to the axis of the revoluble table $e$, and is for the reception and positioning of the load member $g$ which is in the form of a single ball resting upon the upper race $e3$ of the table and projecting above the hole, $f2$, and loosely surrounded by said hole. The load member $g$ has therefore a permanent eccentric position to the axis of rotation of the table $e$, and except for being revoluble about its own axis said load member $g$ is immovable. Said load member is also positioned inwardly of the ring of thrust bearing balls $c$.

The cup $a$, ring of balls $c$, table $e$, cap $f$ and load member $g$, assembled as a lubricant-containing unit, are applied immovably to an outer carrier $x$ by which the unit is fitted to a support for use, as, for example, as shown in Fig. 3, in which $y$ is the side member and $y2$ the bottom member of a drawer provided with a metal bearer strip $y3$. The anti-frictional unit (Fig. 1) is stationarily placed so that the strip $y3$ rests upon the upper surface of the ball and travels over it in a straight-line at right-angles to a radial line of the revoluble table passing through the axis of the ball. The reciprocation of the drawer $y$, $y2$, $y3$, revolves the load member $g$ about its own axis and freely in the hole $f2$, and the load member forces revolution of the table $e$ about the table's axis, so that the slidable drawer is most efficiently anti-frictionally supported, it being understood that any number of anti-frictional units aforesaid are applied for the support of the drawer in the manner described.

It is always preferable that the axis of revolution of the table be vertical, but it may be inclined, pitching the load member downwardly and against the ball race e3.

It is also preferable that the traverse of the load be truly at right-angles as aforesaid, but the invention in practice admits of some variations from this right-angled traverse.

In Fig. 10 a ring of rollers is substituted for a ring of balls to support the table.

In Figs. 11 and 12 the invention is shown suitable as an end abutment for a revoluble part such as a spindle or axle, the axis of the latter being concentric with the axis of the revoluble table e. In this form three load members g are arranged to work against the same table, each being equally eccentrically placed in separate holes j2 to the axis of the table and arranged equi-distant from each other. The end of the spindle or shaft is shaped to make proper contact with these three load members with, of course, pressure of the shaft against said members.

In Fig. 13 three or more rollers j are substituted for the balls Figs. 11 and 12, and in this form the rollers are permanently located eccentrically to the axis of the table by pivot ends j2 of them loosely engaging corresponding parts of the cap.

In Fig. 14 two bearings according to the invention are shown for the anti-frictional mounting of a single load member such as a roller. On this roller, g, g, are the two spherical load members rigidly coupled by an intermediate portion l and each of these members g, g, works against a separate revoluble table e in the same permanent eccentric location to the axis of revolution of the table as previously described. m indicates a bed on which the two bearings or supports are mounted.

In Fig. 15 a coiled spring n in compression normally forces the anti-frictional unit upwardly in an additional outer casing containing the unit so that the load member normally projects above the upper surface of the outer casing for use. If a very heavy pressure is placed on the ball the whole anti-frictional unit will be moved downwardly in the outer casing so that the load member g is flush with the upper surface of the outer casing. This adaptation of the invention provides an anti-frictional bearing useful for supporting a bolster on a power press for adjusting the bolster to the plunger tool and then allowing of it being clamped down to the bed by the usual clamping bolts.

Fig. 16 shows how three or more bearings according to the invention can be arranged about a circle to provide radial support for a bush o engaged by a shaft or spindle s.

In Fig. 17 a form of the invention is shown in which the rotation of the table e is utilized for driving a shaft v upon which is mounted any desired rotor, such, for example, as the grinding wheel v2, the stationary casing a of the bearing or support being held in a suitable carrier v3.

In Fig. 18 a form of the invention is shown using a single cylindrical roller j as the load member and two revoluble tables e, e1 in the same casing and in the same plane, each table having a different axis of rotation. In this arrangement the one end of the roller contacts one table, and the other end of said roller contacts the other table. The ends of the rollers are permanently but loosely located by pivot ends j2 with the casing.

In Fig. 19 a form of the invention is shown similar to Fig. 18 but the roller j forming the load member extends diametrically across the bearing or support. The ends j3 of this roller contacts the table e, while the end j4 of this roller contacts the table e1 and is free of the table e. The location of the load member is by pivot ends j2, similar to Fig. 18.

In Fig. 20 two bearings or supports (Fig. 19) are applied obliquely to a base t to anti-frictionally support a V slide u such as the table of a planing machine.

From the foregoing it will be clear that the invention has many adaptations and uses, and that the most desirable manner of using it is with the axis of the revoluble table vertical, but said axis can be inclined if the load member has a downward pressure against its race in the table, and can be placed horizontally if the pressure of the load is downwardly against its race in the table and also against the table.

Having now described my invention, what I claim and desire to secure by Letters Patent is—

In an anti-frictional bearing for a straight line moving load, a casing comprising a cap having an eccentric hole formed therein, said casing being enclosed except for said hole, a single table disposed within said casing and adapted for concentrical revolution only about the axis of said casing, ball races formed on the upper and lower faces of said table, anti-frictional means supporting said table within said casing, the ball race upon the upper face of said table being immediately below said eccentric hole, and a load ball located within and fitting said eccentric hole, the upper surface of said load ball projecting above said hole, the lower surface of said load ball working in close contact with the ball race in the upper face of said table.

CLAUDE MORTIMER TOWNSEND.